(12) United States Patent
Zhang et al.

(10) Patent No.: US 12,122,685 B1
(45) Date of Patent: Oct. 22, 2024

(54) METHOD FOR PREPARING $MoF_6$ BASED ON PLASMA ACTIVATION OF $SF_6$

(71) Applicants: Hubei University of Technology, Wuhan (CN); Handan Puxin Electric Power Technology Co., Ltd., Handan (CN)

(72) Inventors: Xiaoxing Zhang, Wuhan (CN); Yalong Li, Wuhan (CN); Zhaodi Yang, Wuhan (CN); Kun Wan, Wuhan (CN); Shuangshuang Tian, Wuhan (CN); Guozhi Zhang, Wuhan (CN); Yin Zhang, Wuhan (CN); Yunjian Wu, Wuhan (CN); Guoguang Zhang, Wuhan (CN); Guangke Li, Handan (CN)

(73) Assignees: Hubei University of Technology, Wuhan (CN); Handan Puxin Electric Power Technology Co., Ltd., Handan (CN)

( * ) Notice: Subject to any disclaimer, the term of this patent is extended or adjusted under 35 U.S.C. 154(b) by 0 days.

(21) Appl. No.: 18/656,350

(22) Filed: May 6, 2024

(30) Foreign Application Priority Data

Jun. 1, 2023 (CN) .......................... 202310643329.9

(51) Int. Cl.
*C01G 39/04* (2006.01)

(52) U.S. Cl.
CPC .................................... *C01G 39/04* (2013.01)

(58) Field of Classification Search
CPC ....................................................... C01G 39/04
USPC ........................................................... 423/492
See application file for complete search history.

(56) References Cited

U.S. PATENT DOCUMENTS

2020/0235132 A1\* 7/2020 Suzuki ................ H01L 27/1222

FOREIGN PATENT DOCUMENTS

| CN | 102557045 A | 7/2012 |
|----|-------------|--------|
| CN | 111115687 A | 5/2020 |
| CN | 111128667 A | 5/2020 |

\* cited by examiner

*Primary Examiner* — Edward M Johnson
(74) *Attorney, Agent, or Firm* — George D. Morgan

(57) ABSTRACT

A method and a device for preparing $MoF_6$ based on plasma activation of $SF_6$. The method includes the following steps: S1, filling a discharge area of a plasma reactor with molybdenum powder; S2, introducing an inert gas and an $SF_6$ gas into the discharge area of the plasma reactor, where the inert gas is ionized into plasma, and the $SF_6$ gas is ionized into fluorine atoms and low-fluorine sulfides after being activated by the plasma; and S3, generating an $MoF_6$ gas and sulfur elements through reaction of the fluorine atoms and the low-fluorine sulfides with the molybdenum powder.

9 Claims, 1 Drawing Sheet

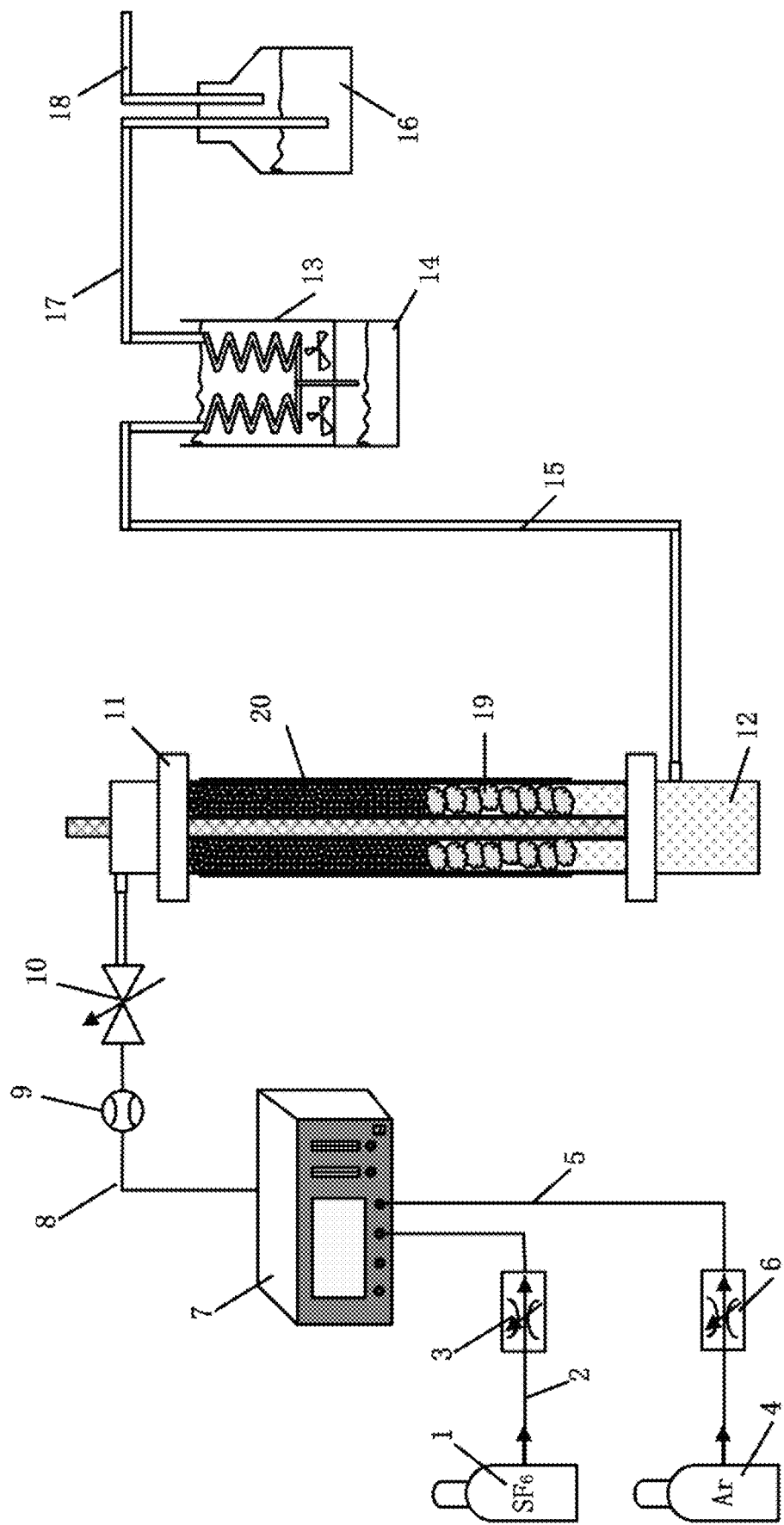

METHOD FOR PREPARING MoF$_6$ BASED ON PLASMA ACTIVATION OF SF$_6$

CROSS-REFERENCE TO RELATED APPLICATIONS

The application claims priority to Chinese patent application No. 2023106433299, filed on Jun. 1, 2023, the entire contents of which are incorporated herein by reference.

TECHNICAL FIELD

The present disclosure belongs to the technical field of resource utilization of sulfur hexafluoride (SF$_6$), and particularly relates to a method and a device for preparing molybdenum hexafluoride (MoF$_6$) based on plasma activation of SF$_6$.

BACKGROUND

Sulfur hexafluoride (SF$_6$) is a synthetic fluoride with an extremely stable molecular structure and an excellent arc extinguishing capability and insulation properties. Since the 1970s, SF$_6$ has been widely used in various electrical equipment mainly as insulation and arc extinguishing media thereof, including gas insulated circuit breakers, gas insulated current transformers, etc. As the gas with the strongest greenhouse effect among non-carbon dioxide greenhouse gases, SF$_6$ also has an extremely long atmospheric lifetime, with its atmospheric content increasing year by year. China's SF$_6$ emissions reached 3.2 (2.6–3.8) Gg/yr in 2018, SF$_6$ emissions are still increasing year by year, and more than 95% of SF$_6$ emissions are generated by the electric power industry.

Since the end of the last century, as environmental protection issues become increasingly prominent year by year, the international community has gradually begun to pay attention to the control of SF$_6$ emissions. As the goals of "carbon peaking and carbon neutrality" were proposed in recent years, the degradation of SF$_6$ has become a general trend. Most researchers choose to degrade the SF$_6$ waste gas. So far, there is no literature report on the resource utilization of the SF$_6$ waste gas.

Molybdenum hexafluoride (MoF$_6$), one representative Fluorine-containing electronic specialty gas, is one of the key raw materials for semiconductor device processing and is called the "blood" of wafer manufacturing. However, currently MoF$_6$ is prepared mostly by use of metal Mo and fluorine (F$_2$) at a high temperature, which has the disadvantages of high operational risk and high energy consumption.

SUMMARY

To solve the above problems existing in the prior art, the present disclosure provides a method and a device for preparing molybdenum hexafluoride (MoF$_6$) based on plasma activation of Sulfur hexafluoride (SF$_6$). In the present disclosure, a catalyst and plasmas are used to activate and ionize SF$_6$ to decompose SF$_6$ into fluorine sulfides and fluorine atoms, the fluorine sulfides and the fluorine atoms react with Mo to generate an MoF$_6$ gas and S elements, and the S elements and MoF$_6$ generated by the reaction are collected, which not only realizes the sulfur and fluorine resource utilization of SF$_6$, but also replaces highly toxic fluorine with a non-toxic SF$_6$ waste gas for reaction in a plasma sub-reactor, with operational safety and low energy consumption.

To realize the above objective, the present disclosure uses a technical solution as follows:

A method for preparing MoF$_6$ based on plasma activation of SF$_6$, including the following steps:

S1, filling a discharge area of a plasma reactor with molybdenum powder;

S2, introducing an inert gas and an SF$_6$ gas into the discharge area of the plasma reactor, where the inert gas is ionized into plasma, and the SF$_6$ gas is ionized into fluorine atoms and low-fluorine sulfides after being activated by the plasma; and S3, generating an MoF$_6$ gas and sulfur elements through reaction of the fluorine atoms and the low-fluorine sulfides with the molybdenum powder.

Further, in the S1, the molybdenum powder is loaded on quartz wool and then filled into the discharge area of the plasma reactor.

Further, in the S1, the discharge area of the plasma reactor is filled with a catalyst that catalyzes the activation and ionization of SF$_6$, the quartz wool and the catalyst are located on both sides of the plasma reactor, and the catalyst is located on the gas inlet side of the plasma reactor.

Further, the catalyst is selected from at least one of aluminium oxide (Al$_2$O$_3$) and silicon dioxide (SiO$_2$).

Further, the generated MoF$_6$ gas is condensed into a liquid state through a condenser, and then enters a liquid collecting tank for collection.

Further, in the S3, the reaction temperature is controlled to be 120-140° C., ° C. so that the sulfur elements become liquid, and the sulfur elements flow into a sedimentation pool.

Further, the unreacted low-fluorine sulfide gas is absorbed by an alkali liquid treatment pool.

A device for preparing MoF$_6$ based on plasma activation of SF$_6$, includes an SF$_6$ gas supply unit, an inert gas supply unit, a mixing unit and a plasma reactor, where the SF$_6$ gas supply unit and the inert gas supply unit are respectively connected to the mixing unit, the SF$_6$ gas supply unit provides SF$_6$ gas to the mixing unit, the inert gas supply unit provides inert gas to the mixing unit, the mixing unit is connected to the plasma reactor, and the mixing unit mixes the SF$_6$ gas and the inert gas and provides a mixture of the inert gas and the SF$_6$ gas to the plasma reactor.

The SF$_6$ gas supply unit includes an SF$_6$ gas cylinder, a first gas supply branch pipe and a first pressure reducing valve, where one end of the first gas supply branch pipe is connected to the SF$_6$ gas cylinder, and the first pressure reducing valve is installed on the first gas supply branch pipe. The inert gas supply unit includes an inert gas cylinder, a second gas supply branch pipe and a second pressure reducing valve, where one end of the second gas supply branch pipe is connected to the inert gas cylinder, and the second pressure reducing valve is installed on the second gas supply branch pipe. The mixing unit includes a gas distribution instrument, a main gas supply pipe, an electromagnetic flowmeter and a solenoid valve, where the other ends of the first gas supply branch pipe and the second gas supply branch pipe are respectively connected to an inlet of the gas distribution instrument, one end of the main gas supply pipe is connected to an outlet of the gas distribution instrument, the electromagnetic flowmeter and the solenoid valve are respectively installed on the main gas supply pipe, and the other end of the main gas supply pipe is connected to a gas inlet of the plasma reactor.

The plasma reactor is placed vertically or aslant, the gas inlet and the gas outlet of the plasma reactor are located at both ends of the discharge area of the plasma reactor, and the gas inlet of the plasma reactor is located above the gas outlet of the plasma reactor. A sedimentation pool is arranged at the bottom of the plasma reactor, the sedimentation pool is located below the plasma reactor, and the sedimentation pool is communicated with the bottom of the plasma reactor.

A condensation unit is further included, and the condensation unit includes a condenser and a gas outlet pipe, where a liquid collecting tank is arranged at the bottom of the condenser, one end of the gas outlet pipe is communicated with the gas outlet of the plasma reactor, and the other end of the gas outlet pipe is connected to an inlet of the condenser.

A tail gas treatment unit is further included, and the tail gas treatment unit includes an alkali liquid treatment pool, a tail gas inlet pipe and a tail gas outlet pipe, where both ends of the tail gas inlet pipe are connected to the condenser outlet and the alkali liquid treatment pool respectively, and the tail gas outlet pipe is connected to the alkali liquid treatment pool.

Compared with the prior art, the present disclosure has the advantages and beneficial effects as follows:

1. The present disclosure fills the discharge area of the plasma reactor with metal oxide catalysts (such as $Al_2O_3$, $SiO_2$, etc.) to activate $SF_6$ and convert it into fluorine atoms and low-fluorine sulfides.

2. In the present disclosure, the discharge area of the plasma reactor is filled with quartz wool loaded with Mo powder, $SF_6$ is activated and decomposed into low-fluorine sulfides and fluorine atoms under the synergistic action of the plasma and the catalyst, and then under the further catalytic action of Mo, $SF_6$ is further decomposed to generate metal fluorides of $MoF_6$ due to reaction of the fluorine atoms and the low-fluorine sulfides with the loaded Mo powder. The present disclosure realizes the reuse of $SF_6$ fluorine resources, and the quartz wool-loaded Mo powder has a large contact area than pure metal particles, so that the preparation effect is better.

3. The $SF_6$ of the present disclosure is decomposed into the low-fluorine sulfides and the fluorine atoms. The fluorine atoms and the low-fluorine sulfides react with Mo to generate $MoF_6$ metal fluorides and S elements at the same time. The plasma reactor is placed vertically or aslant, and at high temperatures (around 130° C.) in the plasma reactor, the generated are in the liquid state and flow downward into an S element sedimentation pool to realize the reuse of $SF_6$ sulfur resources.

4. The temperature of the condenser of the present disclosure is adjusted according to the actual situation of the generated substances, so that metal fluoride gases such as $MoF_6$ become liquid and enter the liquid collecting tank to facilitate later transportation and purification.

5. The present disclosure adds the alkali liquid treatment pool at a tail end of the device to treat the decomposition products of $SF_6$ such as $SO_2$, $SOF_2$ and $SOF_4$, etc. to prevent them from being discharged into the atmosphere and causing damage to the atmosphere and the environment.

6. The present disclosure, for the first time, discloses a method of generating $MoF_6$ through reaction of a non-toxic $SF_6$ waste gas (in place of a highly toxic fluorine gas) with Mo under plasma conditions. Compared with the traditional method for preparing $MoF_6$ by using metal Mo and fluorine ($F_2$) at a high temperature (250° C. or above), the method disclosed by the present disclosure has the advantages that the reaction temperature is greatly reduced, so that the energy consumption is greatly reduced, the operation is safe, sulfur and fluorine resource utilization of $SF_6$ is realized, and the problem of poor $SF_6$ conversion is solved. Further, when it is not needed to collect sulfur elements, the present disclosure is capable of further reducing the reaction temperature.

BRIEF DESCRIPTION OF DRAWINGS

The FIGURE is a structural schematic diagram of a device for aluminum preparing molybdenum hexafluoride ($MoF_6$) based on plasma activation of sulfur hexafluoride ($SF_6$).

In the figures: 1—SF6 gas cylinder, 2—first gas supply branch pipe, 3—first pressure reducing valve, 4—argon gas cylinder, 5—second gas supply branch pipe, 6—second pressure reducing valve, 7—gas distribution instrument, 8—main gas supply pipe, 9—electromagnetic flowmeter, 10—solenoid valve, 11—plasma reactor, 12—sedimentation pool, 13—condenser, 14—liquid collecting tank, 15—gas outlet pipe, 16—alkali liquid treatment pool, 17—tail gas inlet pipe, 18—tail gas outlet pipe, 19—quartz wool (loaded Mo powder), and 20—catalyst.

DETAILED DESCRIPTION OF THE EMBODIMENTS

A device for aluminum preparing molybdenum hexafluoride ($MoF_6$) based on plasma activation of sulfur hexafluoride ($SF_6$) of the present disclosure will be described in detail below with reference to the accompanying drawings.

Embodiment 1

The structure of a device for aluminum preparing molybdenum hexafluoride ($MoF_6$) based on plasma activation of sulfur hexafluoride ($SF_6$) provided in this embodiment is shown in the FIGURE, and the device includes an $SF_6$ gas supply unit, an inert gas supply unit, a mixing unit, a plasma reactor 11, a condensation unit and a tail gas treatment unit, where the plasma reactor 11 is a dielectric barrier plasma reactor.

The $SF_6$ gas supply unit includes an $SF_6$ gas cylinder 1, a first gas supply branch pipe 2 and a first pressure reducing valve 3, where one end of the first gas supply branch pipe 2 is connected to the $SF_6$ gas cylinder 1, and the first pressure reducing valve 3 is installed on the first gas supply branch pipe 2. The inert gas supply unit includes an argon gas cylinder 4, a second gas supply branch pipe 5 and a second pressure reducing valve 6, where one end of the second gas supply branch pipe 5 is connected to the argon gas cylinder 4, and the second pressure reducing valve 6 is installed on the second gas supply branch pipe 5. The $SF_6$ in the $SF_6$ gas cylinder 1 and the argon gas in the argon gas cylinder 4 are decompressed through the pressure reducing valve and then enter the gas distribution instrument.

The mixing unit includes a gas distribution instrument 7, a main gas supply pipe 8, an electromagnetic flowmeter 9 and a solenoid valve 10, where the other ends of the first gas supply branch pipe 2 and the second gas supply branch pipe 5 are respectively connected to two inlets of the gas distribution instrument 7, and one end of the main gas supply pipe 8 is connected to an outlet of the gas distribution instrument 7. The electromagnetic flowmeter 9 and the solenoid valve 10 are respectively installed on the main gas supply pipe 8, and the electromagnetic flowmeter 9 and the solenoid valve 10 are configured to control the flow rate of a mixed gas of $SF_6$ and argon.

The plasma reactor 11 is placed vertically, a gas inlet of the plasma reactor 11 is arranged on the top of the plasma reactor 11, and the other end of the main gas supply pipe 8 is connected to the gas inlet of the plasma reactor 11. A sedimentation pool 12 is arranged at the bottom of the plasma reactor 11, the sedimentation pool 12 is located below the plasma reactor 11, the sedimentation pool 12 is communicated with the bottom of the plasma reactor 11, and a gas interface is arranged at an upper part of the sedimentation pool 12.

The condensation unit includes a condenser 13 and a gas outlet pipe 15, where one end of the gas outlet pipe 15 is communicated with the gas outlet of the plasma reactor, and the other end of the gas outlet pipe 15 is connected to an inlet of the condenser 13. A liquid collecting tank 14 is arranged at the bottom of the condenser 13, and the condensed $MoF_6$ in the liquid state flows into the liquid collecting tank 14 for collection.

The tail gas treatment unit includes an alkali liquid treatment pool 16, a tail gas inlet pipe 17 and a tail gas outlet pipe 18, where both ends of the tail gas inlet pipe 17 are connected to the outlet of the condenser 13 and the alkali liquid treatment pool 16 respectively, and the tail gas outlet pipe 18 is connected to the alkali liquid treatment pool 16. In the alkali liquid treatment pool, the decomposition products (unreacted) of $SF_6$ such as $SO_2$, $SOF_2$ and $SOF_4$, etc. are absorbed and treated to prevent them from being discharged into the atmosphere and causing damage to the atmosphere and the environment.

A method for aluminum preparing $MoF_6$ based on plasma activation of $SF_6$ of the present disclosure will be described in detail below with reference to the above device.

Example 2

S1, an upper half part of a discharge area of a plasma reactor is filled with a catalyst aluminium oxide ($Al_2O_3$), Mo powder is evenly sprinkled on quartz wool, so that the quartz wool is loaded with the Mo powder, and then the quartz wool loaded with the Mo powder is filled into a lower half part of the discharge area of the plasma reactor;

S2, A device for preparing molybdenum hexafluoride ($MoF_6$) based on plasma activation of sulfur hexafluoride ($SF_6$) is assembled and connected according to the connection relationship of the above device (as shown in the FIGURE);

S3, a second pressure reducing valve 6 is opened, air tightness of the device is detected through an argon gas to prevent harm to the staff caused by toxic gas leakage during a reaction and ensure the stable and orderly reaction, and the second pressure reducing valve 6 is closed after the detection;

S4, a first pressure reducing valve 3 and the second pressure reducing valve 6 are opened, and the $SF_6$ gas in an $SF_6$ cylinder 1 and the argon gas in an argon gas cylinder 4 are decompressed and then enter a gas distribution device 7 for mixing evenly; and in this case, a condenser 13 is opened until the liquefaction temperature of $MoF_6$ gas reaches 17.5° C.;

S5, a plasma reactor 11 is turned on, and the input voltage and input power are set to 55 V and 90 W respectively, where the temperature in the plasma reactor 11 will rise at the beginning, but after 15 minutes, the temperature in the plasma reactor 11 will stabilize at 130° C.;

S6, an electromagnetic flowmeter 9 and a solenoid valve 10 are opened, and the flow rate of a mixed gas of $SF_6$ and argon is controlled to be 150 ml/min, where the argon gas is ionized into plasma, the $SF_6$ gas, under the synergistic action of the plasma and a catalyst 20 $Al_2O_3$, is decomposed into fluorine atoms and low-fluorine sulfides (such as $SO_2$, $SOF_2$, $SOF_4$, etc.), the fluorine atoms and the low-fluorine sulfides react with the Mo powder loaded on quartz wool 19 to generate the $MoF_6$ gas and a small amount of liquid S elements, the liquid S elements flow downward into a sedimentation tank 12 for collection, the $MoF_6$ gas enters the condenser 13 for liquefaction and then flows into a liquid collecting tank 14 after the liquefaction, subsequently tail gas is treated through an alkali liquid treatment pool 16, and unreacted decomposition products of $SF_6$ (such as $F_2$, $SO_2$, $SOF_2$, $SOF_4$ and other gases) are absorbed; and S7, when no liquid flows out of the condenser, the first pressure reducing valve 3 is closed, after ten minutes, the plasma reactor 11 is closed and argon gas is continuously filled, so that the gas in the plasma reactor 11 is driven to sequentially pass through the condenser 13 and the alkali liquid treatment pool 16, after ten minutes, the condenser 13 and the second pressure reducing valve 6 are closed, and the $MoF_6$ liquid in the liquid collecting tank is taken out and frozen for storage.

What is claimed is:

1. A method for preparing molybdenum hexafluoride ($MoF_6$), comprising the following steps:

S1, filling a discharge area of a plasma reactor with molybdenum powder, and filling the discharge area of the plasma reactor with a catalyst that catalyzes activation and ionization of sulfur hexafluoride ($SF_6$), wherein the catalyst is selected from at least one of aluminium oxide ($Al_2O_3$) and silicon dioxide ($SiO_2$);

S2, introducing an inert gas and an $SF_6$ gas into the discharge area of the plasma reactor, wherein the inert gas is ionized into plasma, and the $SF_6$ gas is ionized into fluorine atoms and low-fluorine sulfides after being activated by the plasma; and S3, generating an $MoF_6$ gas and sulfur elements through reaction of the fluorine atoms and the low-fluorine sulfides with the molybdenum powder.

2. The method for preparing $MoF_6$ according to claim 1, wherein in the S1, the molybdenum powder is loaded on quartz wool and then filled into the discharge area of the plasma reactor.

3. The method for preparing $MoF_6$ according to claim 1, wherein the generated $MoF_6$ gas is condensed into a liquid state, and then is collected.

4. The method for preparing $MoF_6$ according to claim 1, wherein in the S3, a reaction temperature is controlled to be 120-140° C., so that the sulfur elements become liquid for collection.

5. The method for preparing $MoF_6$ according to claim 1, wherein an unreacted low-fluorine sulfide gas is absorbed by alkali liquid.

6. The method for preparing $MoF_6$ according to claim 1, wherein a device for implementing the method for preparing $MoF_6$ based on plasma activation of $SF_6$, comprises an $SF_6$ gas supply unit, an inert gas supply unit, a mixing unit and a plasma reactor, wherein the $SF_6$ gas supply unit and the inert gas supply unit are respectively connected to the mixing unit, the $SF_6$ gas supply unit provides $SF_6$ gas to the mixing unit, the inert gas supply unit provides inert gas to the mixing unit, the mixing unit is connected to the plasma reactor, and the mixing unit mixes the $SF_6$ gas and the inert gas and provides a mixture of the inert gas and the $SF_6$ gas to the plasma reactor.

7. The method for preparing $MoF_6$ according to claim 6, wherein the plasma reactor is placed vertically or aslant, a gas inlet and a gas outlet of the plasma reactor are located at two ends of the discharge area of the plasma reactor, and the gas inlet of the plasma reactor is located above the gas outlet of the plasma reactor; and a sedimentation pool is arranged at a bottom of the plasma reactor, the sedimentation pool is located below the plasma reactor, and the sedimentation pool is communicated with the bottom of the plasma reactor.

8. The method for preparing $MoF_6$ according to claim 7, wherein a condensation unit is further comprised, and the condensation unit comprises a condenser and a gas outlet pipe, wherein a liquid collecting tank is arranged at a bottom of the condenser, one end of the gas outlet pipe is communicated with the gas outlet of the plasma reactor, and the other end of the gas outlet pipe is connected to an inlet of the condenser.

9. The method for preparing $MoF_6$ according to claim 8, wherein a tail gas treatment unit is further comprised, and the tail gas treatment unit comprises an alkali liquid treatment pool, a tail gas inlet pipe and a tail gas outlet pipe, wherein two ends of the tail gas inlet pipe are connected to an outlet of the condenser and the alkali liquid treatment pool respectively, and the tail gas outlet pipe is connected to the alkali liquid treatment pool.

* * * * *